United States Patent [19]

Erdman

[11] 4,037,734
[45] July 26, 1977

[54] METHOD AND APPARATUS FOR DEPALLETIZING

[75] Inventor: Frank H. Erdman, Holmes Beach, Fla.

[73] Assignee: Tropicana Products, Inc., Bradenton, Fla.

[21] Appl. No.: 664,366

[22] Filed: Mar. 5, 1976

[51] Int. Cl.$^2$ .............................................. B65G 59/06
[52] U.S. Cl. .............................. 214/8.5 A; 214/1 QA; 214/152
[58] Field of Search ................ 214/1 Q, 1 QA, 8.5 R, 214/8.5 A, 8.5 F, 8.5 K, 152

[56] References Cited

U.S. PATENT DOCUMENTS

| | | | |
|---|---|---|---|
| 3,123,232 | 3/1964 | Postlewaite | 214/8.5 R X |
| 3,297,174 | 1/1967 | Letchworth | 214/1 QA X |
| 3,386,598 | 6/1968 | Ferko | 214/1 QA |
| 3,502,230 | 3/1970 | Grey et al. | 214/8.5 A X |
| 3,690,650 | 9/1972 | Maier, Jr. et al. | 214/8.5 A X |
| 3,946,880 | 3/1976 | Schmitt | 214/8.5 R |

*Primary Examiner*—Frank E. Werner

*Attorney, Agent, or Firm*—Burns, Doane, Swecker & Mathis

[57] ABSTRACT

A method and apparatus are disclosed for unloading a pallet stacked with inverted, bottom-open cases of bottles to be filled. The loaded pallet is placed on a pivotable support frame which embraces the top, bottom, and one or three sides of the loaded pallet, and the support frame and pallet are rotated through approximately ninety degrees. A hinged, fingered, platform on the pivotable support frame that embraces the top layer of cases of the pallet load is next rotated together with that layer through another 90° arc, transferring the case to a succeeding hinged, fingered platform which, in turn, rotates the layer another 180° (back to its original orientation). The transposed layer is then pushed onto a conveyor, the covering cartons removed, and the bottles conveyed to a filling machine. The fingered platforms return for another layer, repeating the cycle until all of the cases have been removed from the pallet. The empty pallet is ejected and stacked or removed and the pivotable support frame returns to the original position to accept another full pallet load of cases.

26 Claims, 15 Drawing Figures

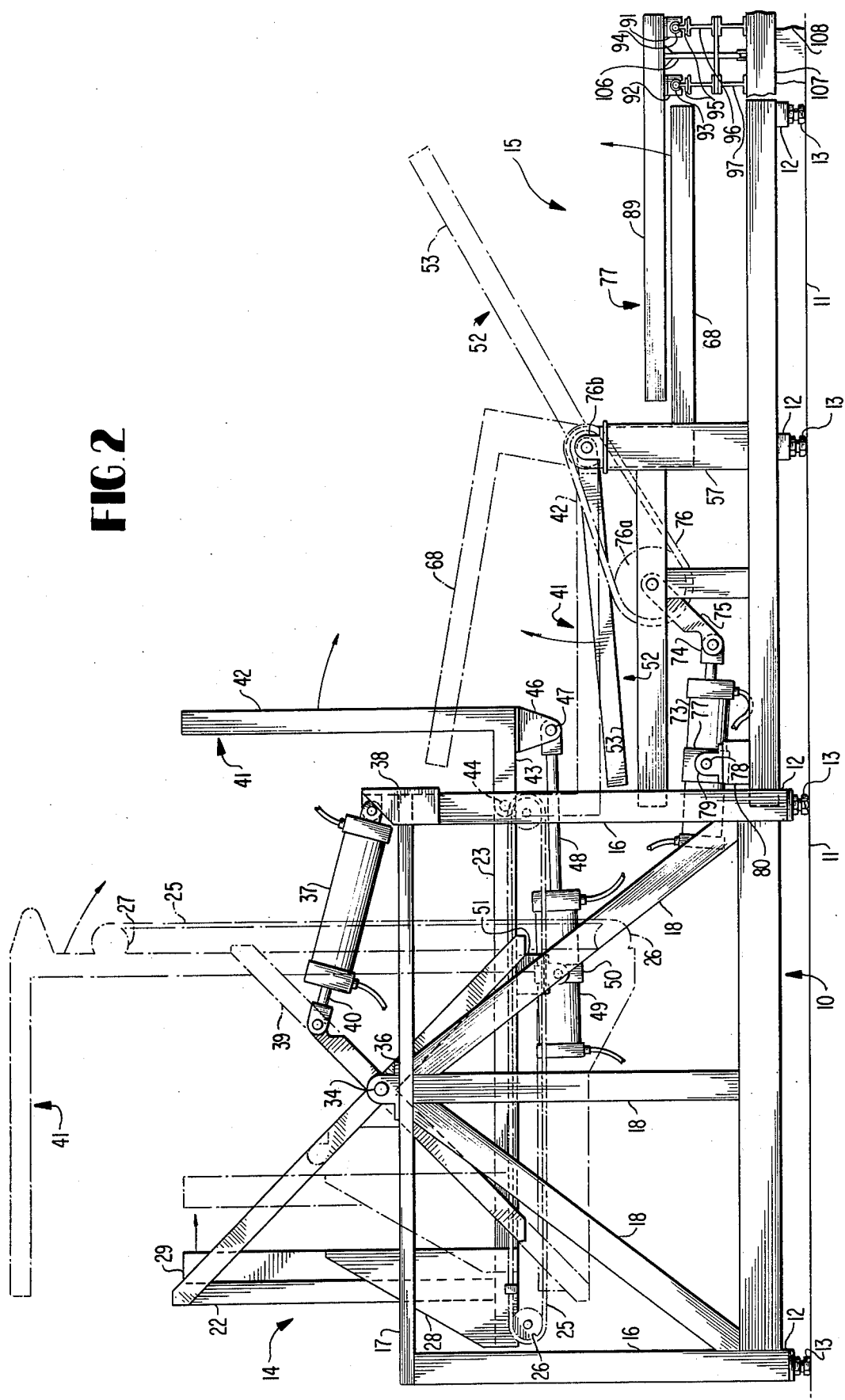

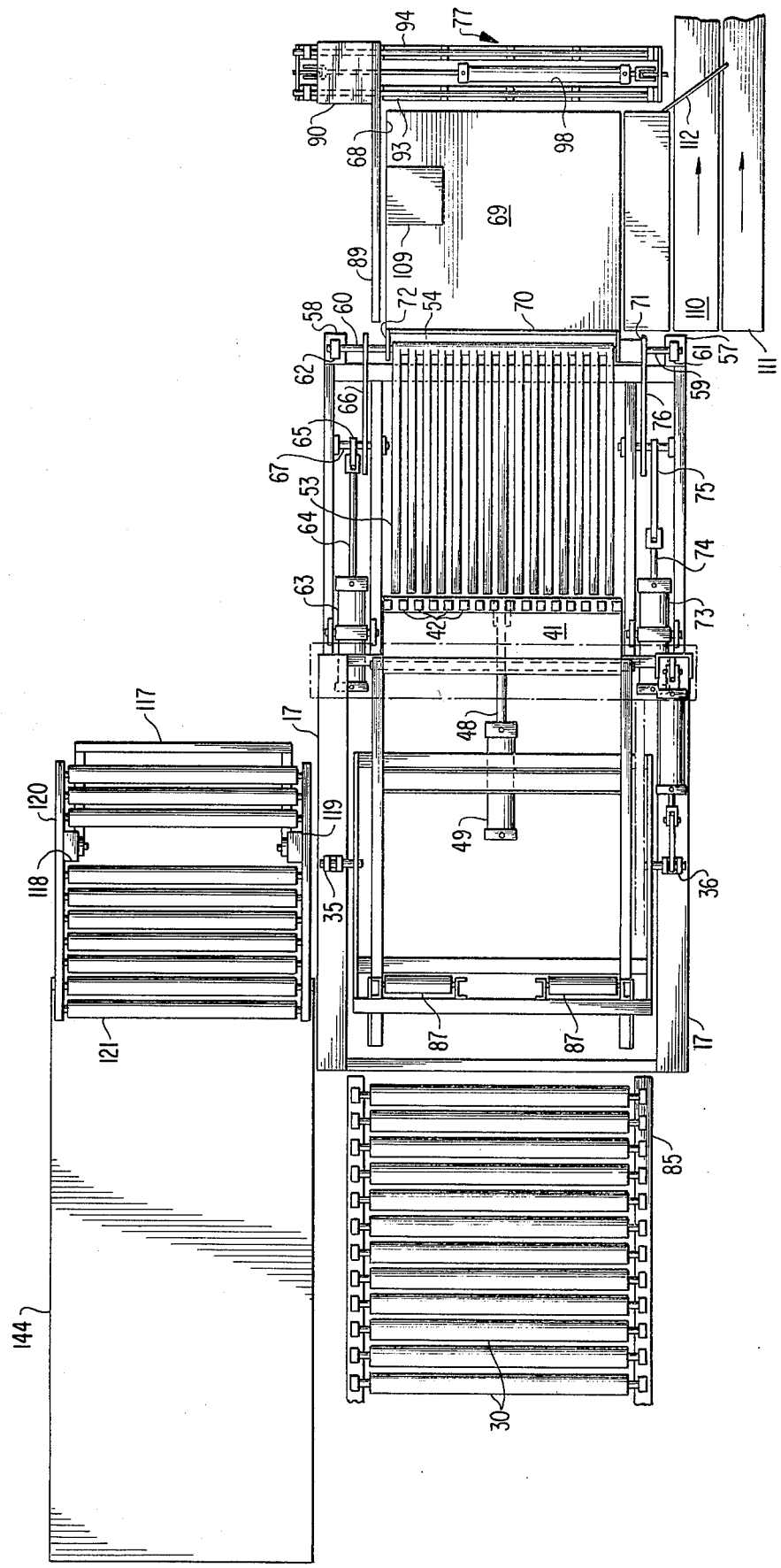

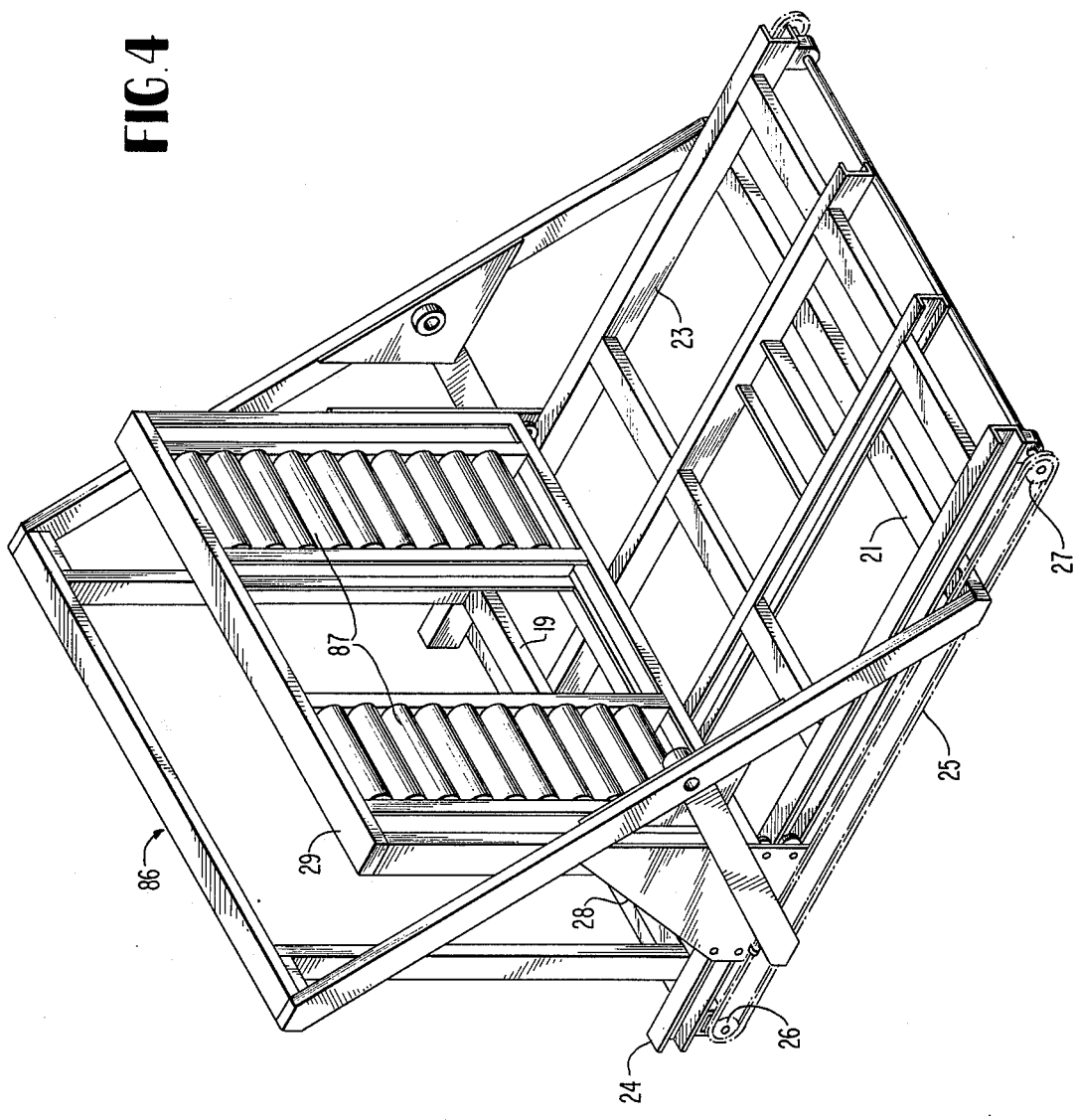

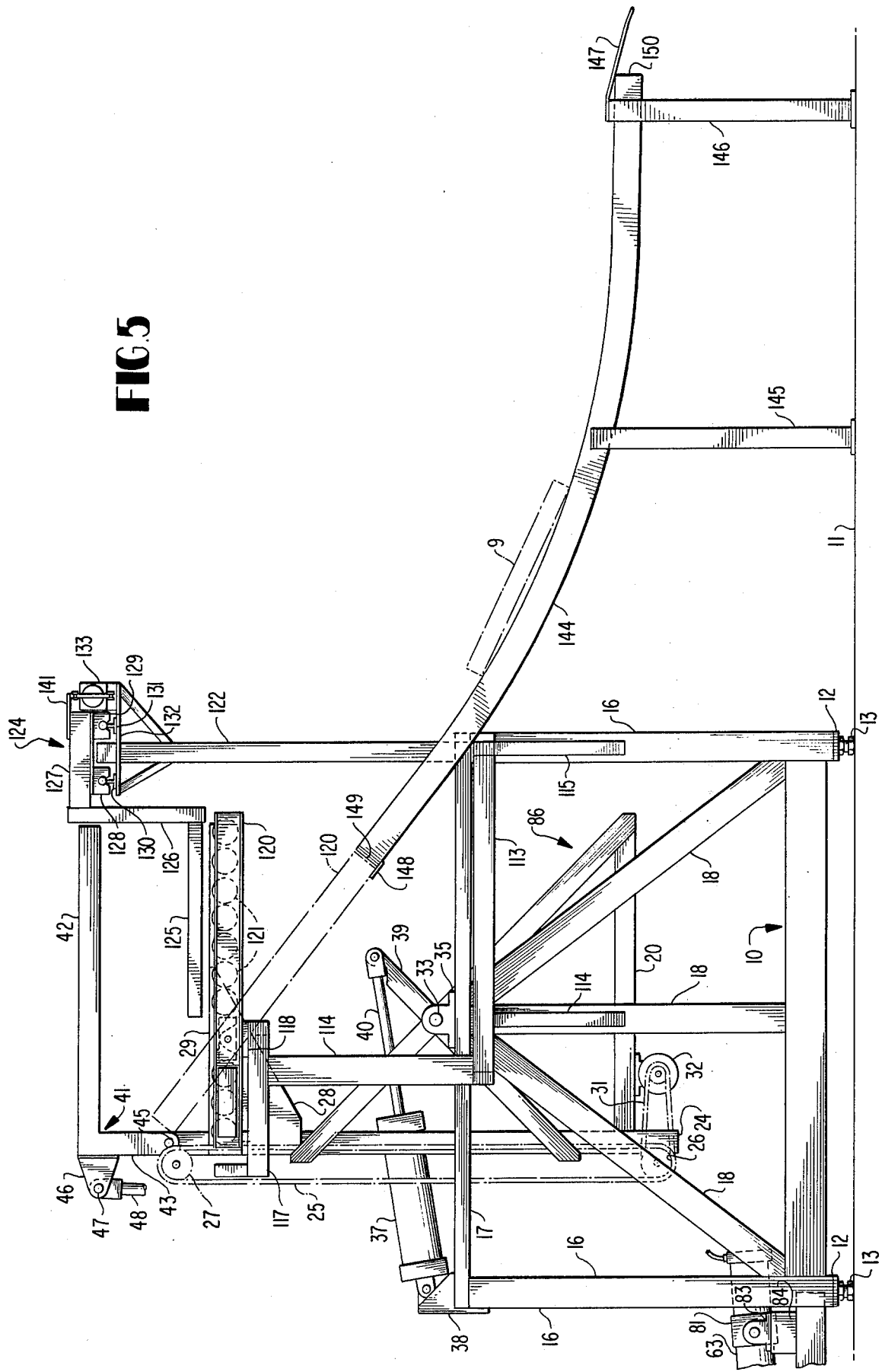

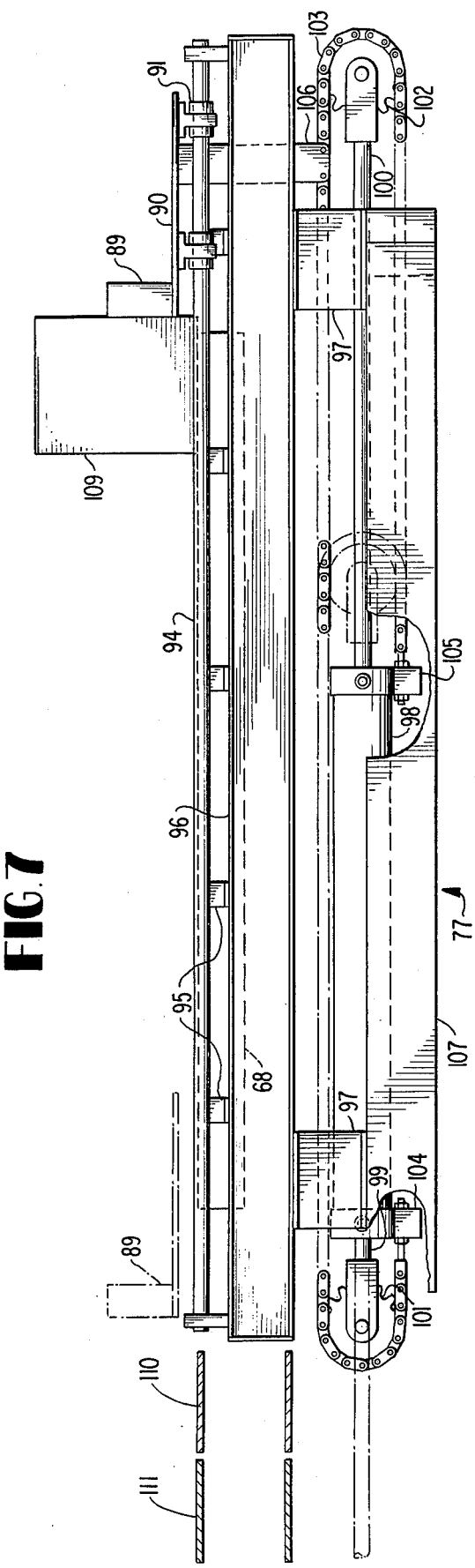
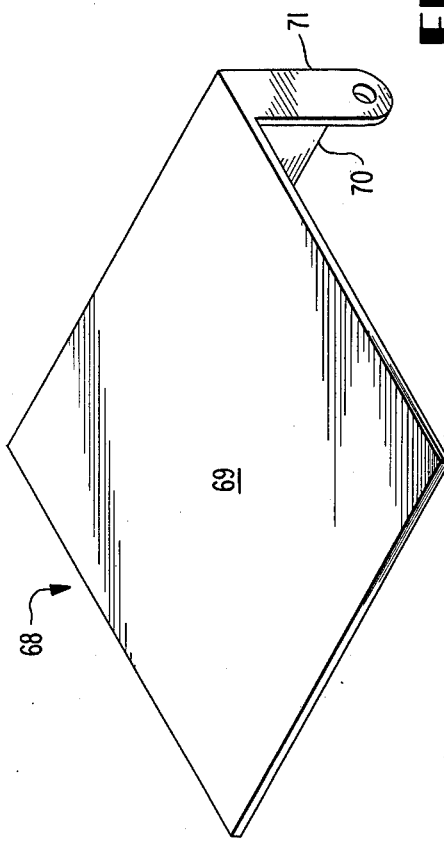

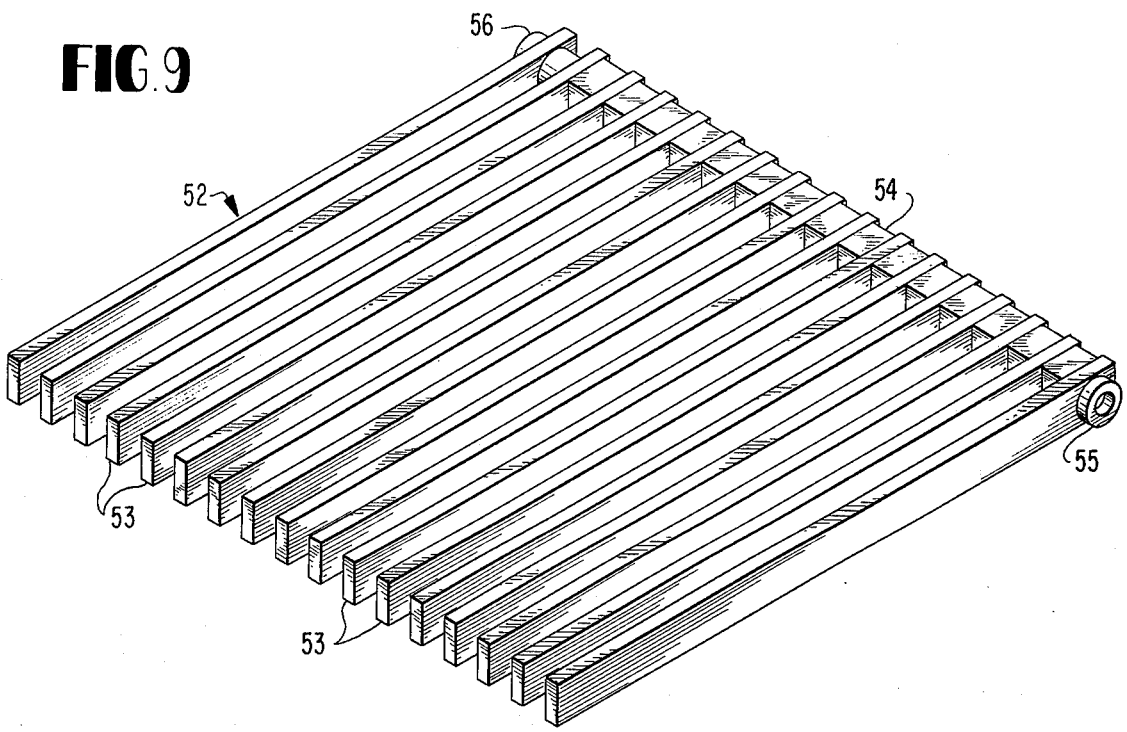
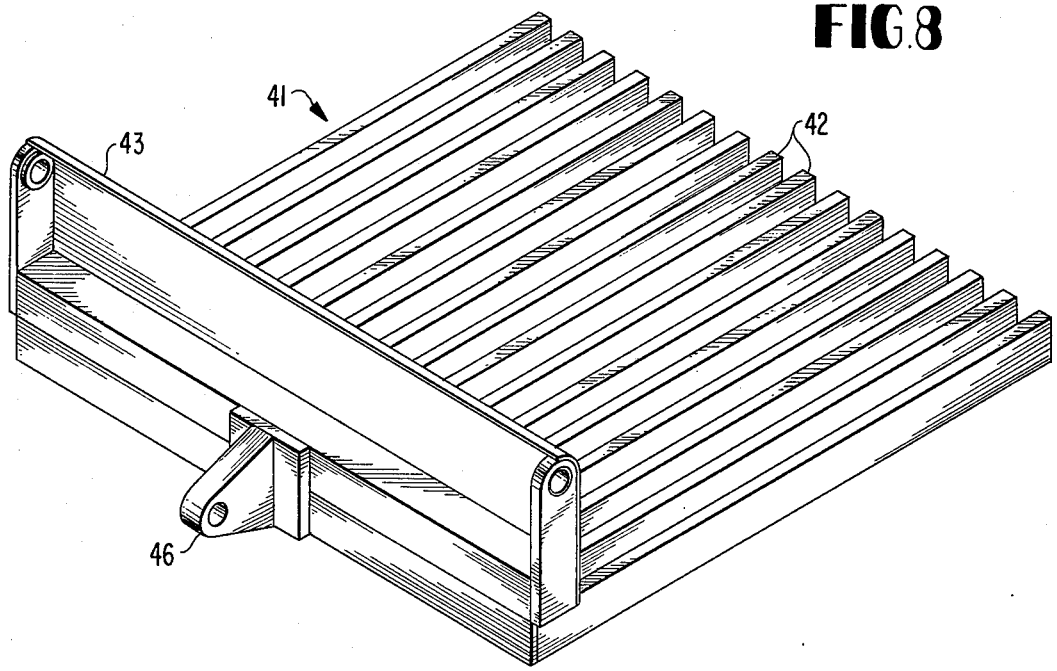

METHOD AND APPARATUS FOR DEPALLETIZING

BACKGROUND OF THE INVENTION

This invention relates, in general, to a method and apparatus for unloading a pallet stacked with layers of similarly-shaped objects and, in particular, it relates to a method and apparatus for handling cases or cartons stacked on a pallet and for transferring them from the pallet to a conveyor. More particularly, the present invention relates to a method and apparatus for automatically successively transferring individual layers of cases containing empty bottles from a palletized stack of such cases with bottom flaps unglued to a conveyor system for transportation to bottle-filling lines. Still more particularly, the invention relates to a method and apparatus for unloading a pallet stacked with cases of bottles in such a manner that the unglued bottom flaps are placed on a conveyor so that the bottles may be removed by lifting each case leaving the bottles in an upright position (standing on their bottoms) ready to be transported to a filling machine.

It will be realized, of course, that the invention is applicable to depalletizing a stack of any parallelepiped-shaped objects, especially where similar orientation before and after being depalletized is a matter of concern.

In a bottling plant, empty bottles or jars are frequently received from a storage warehouse or glass plant packed in cardboard cartons or cases and stacked on pallets. Because the bottles must be removed from the cases before entering the automatic filling machine, the case flaps are ordinarily glued on one side only. Depending on the preferred practice in a given plant, the cases can be stacked on the pallet with their open, unglued sides either up or down.

to supply those bottling plants whose preferred practice is to stack the cases of empty bottles with the open, unglued flaps facing downward, empty cases are initially formed in an inverted position and their top flaps glued shut by machines which were designed specifically for this function. The cases are then carried by conveyor, riding on their glued top flaps (still inverted so that the bottom flaps project more or less vertically up) to the ends of the bottle production lines. At this point, the bottles are inserted into the cases through the open bottom, with the bottle finish or necks against the top glued flaps. The bottom flaps are then folded into closed position, but not glued, and the filled cases are then transported to palletizers, now riding on the folded unglued bottom flaps. The cases are then stacked on a pallet with the bottom flaps down and still unglued. If the cases are stacked on the pallets with their unglued flaps down and are transferred to the conveyor in that position, it is then merely necessary to lift off the cases to leave the bottles upright on the conveyor and ready for transfer to the filling machine.

Regardless of whether the cases are stacked with their open sides up or down, problems arise when an attempt is made to transfer the cases from the pallet to a moving conveyor by sliding the top layer of the stack horizontally onto the conveyor. These problems stem from the fact that the unglued flaps tend to interlock with the adjacent layer.

In small establishments handling a relatively low volume of cases and requiring little warehouse space for empty bottles, it is possible to insert a corrugated slip sheet between each layer of cases while the pallet is being loaded. When this is done, it is then very easy to slide one layer of cases off at a time. However, in large establishments whose distribution is on a national or even international scale, millions of cases of empty bottles are frequently kept on hand in warehouses. Under these circumstances, the slip sheet technique becaomes extremely expensive and impractical.

One suggested solution to the problem of depalletizing has been to lift off the top layer of cases with a vacuum suction head and then to place the cases on a conveyor system. However, in addition to involving the installation of much expensive equipment, vacuum-type equipment cannot be used in plants where the practice is to stack the cases in their inverted position unless provision were first made to rotate the full pallet 180°.

As an alternative to vacuum-type depalletizing, particularly where the cases are stacked on the pallets with their unglued sides down, it would be necessary to devise an efficient system for sliding individual cases from the pallet. Otherwise it would be necessary to raise and remove individual cases while suppoting them from below during the transfer process so that the bottles do not drop out and the cases would remain in the same inverted position as when they were stacked on the pallet when they are finally placed on the moving conveyor.

The material-handling art contains numerous examples of suggestions of apparatus for transferring containers or other large objects from one location to another, including to a conveyor, in which the item handled is rotated during the transfer process. In U.S. Pat. 1,943,530 for example, there is disclosed a machine which clamps a drum at both ends, turns it 90°, and then deposits it on a moving conveyor. Another patent (U.S. Pat. No. 2,520,252) discloses a machine which clamps a skid of paper at its top and bottom and rotates it 180° to permit printing on both sides of the sheet. Still another patent (U.S. Pat. No. 3,024,929) discloses a device for emptying a box. The box, filled with objects which it is desired to dump onto a floor or table is placed on a pallet, the two are clamped together at their top and bottom, and then rotated 180° C to invert the box and dump its contents. The box is clamped at three points along its top edge while being inverted.

Because of the widespread practice of stacking cases of empty bottles on pallets with the unglued, bottom flaps of the cases facing downward, it will be readily apparent that, to transfer cases so stacked from a pallet without sliding the top layer would require rotation of individual cases or a layer of cases through a full 360°.

For this reason, it would not be possible to use the above referred to prior art proposals to unload and transfer the cases from pallets to a moving conveyor and to place them on the latter oriented in the same manner as on the pallets since none of the presently available machines is capable of rotating a case through a full 360° arc or through any arc, for that matter, without dumping the empty bottles from the unglued side of the case.

Accordingly, a principal object of the present invention is to provide an apparatus for unloading a pallet stacked with similarly-shaped objects, parallelepiped-shaped in particular, and capable of depositing then on a surface similarly oriented as on the pallet.

Another object is to provide a depalletizing apparatus which is capable of automatically carrying out a sequence of steps from an initial presentation of a stacked pallet to the ultimate removal of an empty pallet.

Another object is to provide a novel apparatus and method for handling cases of glassware to transfer them safely from a stack on a pallet to a moving coveyor.

Still another object is to provide an apparatus which will transfer individual layers of cases from a stacked pallet without sliding the upper layer over the next lower succeeding layer of cases.

A further object is to provide an apparatus for unloading a pallet stacked with cases of empty bottles whereby individual layers of cases are manipulated through a full 360° arc and deposited on a moving conveyor for transporation to a bottling machine or any other handling.

Still a further object is to provide an apparatus for unloading a pallet on which cases of bottles are stacked with the unglued side of the cases facing downward.

Yet another object is to provide such an apparatus which is capable of transferring individual cases or individual layers of cases from a stack to a conveyor and placing them on the conveyor in the same open-side downward position they occupied in the stack.

A further object is to provide a depalletizing apparatus in which emptied pallets are ejected from the device and collected for reuse.

These and other objects, which will be apparent to those skilled in this art, are achieved by means of the present invention, a description of which is set forth below.

SUMMARY OF THE INVENTION

In accordance with the present invention a pallet stacked with cases containing empty bottles is placed on a pivotable support frame that embraces the loaded pallet on the top, bottom, and one or three sides. Thereafter, the support, together with the loaded pallet, is rotated through approximately 90° of arc so that the pallet and cases are in effect, in a reclining position and the top layer becomes a first, end row. A hinged portion of the pivotable support in the form of a tray that embraces the top layer of the pallet load is next rotated together with that top layer, through a second 90° arc so that the top layer comes to rest on the hinged tray rotated 180°, that is, in an inverted horizontal position with respect to that which it originally had on the pallet.

The axis of rotation of the hinged tray is disposed sufficiently behind the center of gravity of the top layer, e.g., near the trailing edges of the top layer, to enable the top layer to separate and rotate by gravity with the rotation of the hinged tray through the said second 90° arc.

The inverted top layer is thereafter further inverted 180° to assume the same orientation as in the original stack on the pallet. In a particular embodiment of the present invention, the above-mentioned hinged tray, constructed of a plurality of rigid, parallel fingers joined to a rigid bar which serves as the axis, interdigitates with an adjacent, succeeding pivotable fingered support which removes the cases from the first support and is rotated to turn the support cases through a further 180° arc, coming to rest adjacent a conveyor belt. A third hinged tray closes over the supported cases during the 180° rotation. In their final position, the cases are oriented as in the original stack on the pallet, that is, with their unglued flaps facing downward. They are then pushed from the third tray onto the conveyor to be transported to the bottling machine. This sequence of steps is repeated until all of the layers of cases have been removed from the pallet and the latter is ejected from the machine to make room for a succeeding loaded pallet.

BRIEF DESCRIPTION OF THE DRAWINGS

In order that the invention may be more readily understood, reference is made to the accompanying drawings in which like numerals refer to like elements and in which:

FIG. 2 is a semi-schematic side elevational view of an assembled depalletizer according to the present invention in which the transfer of depalletized cases is from left to right in the figure.

FIG. 3 is a plan view of the depalletizer shown in FIG. 2.

FIG. 4 is an isometric view of the pivotable support and elevator assembly on which a loaded pallet is placed for removal of the stacked cases.

FIG. 5 is also a side elevational view, similar to that of FIG. 2, except that the apparatus is viewed from the opposite side to show the chute on which an unloaded pallet is removed from the vicinity of the apparatus.

FIG. 7 is an end elevational view of the output end of the apparatus showing the means by which individual cases are placed on a conveyor after having been removed in accordance with the present invention from a stacked pallet.

FIG. 8 is an isometric view of the first fingered tray-like support platform which holds and then removes the top layer of cases from a stacked pallet.

FIG. 9 is an isometric view of the second fingered tray-like support platform which receives the first layer of cases from the tray shown in FIG. 8 and then transfer it to a third tray-like support platform or transport table from which the cases are eventually pushed onto an endless belt conveyor.

FIG. 10 is an isometric view of the third tray-like platform.

DESCRIPTION OF PREFERRED EMBODIMENTS

Figure 11:
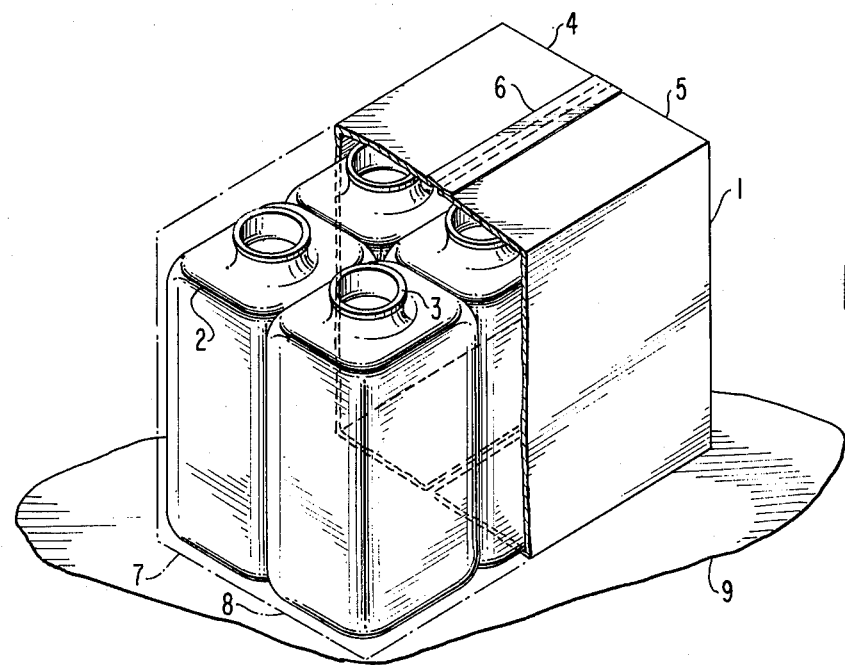
FIG. 11 is an isometric view of a filled case, resting on the side of its unglued flaps, with parts broken away showing the manner in which bottles are packed in the cases.

As already mentioned, a preferred manner of delivery of empty bottles to a filling plan involves packing the bottles upright in cases or cartons and gluing only the top flaps of the latter. Thus, referring to FIG. 11, there is seen a case 1 in which a number of bottles 2 are packed with their mouths 3 facing upward. Top flaps 4 and 5 are glued in any suitable manner as by means of tape 6, while bottom flaps 7 and 8 remain unglued. The so-filled cases arrive at the bottling plant stacked on a pallet 9 with their unglued flaps 7 and 8 oriented downwardly, as shown in FIG. 11.

In order to make the bottles available for filling while keeping handling to a minimum, it is desirable that the cases be removed from the pallets and placed on a single layer on a conveyor oriented in the same manner as when on the pallet, that is, with the unglued flaps 7 and 8 down. It is then merely necessary to lift off the cases to expose the bottles and convey them to a filling machine or other operating station. This is achieved in accordance with the present invention by the method and apparatus described below.

The general operation of the depalletizing apparatus of the present invention is shown schematically in FIGS. 1A-1E, the components of which are described in more detail below.

Figure 1A:
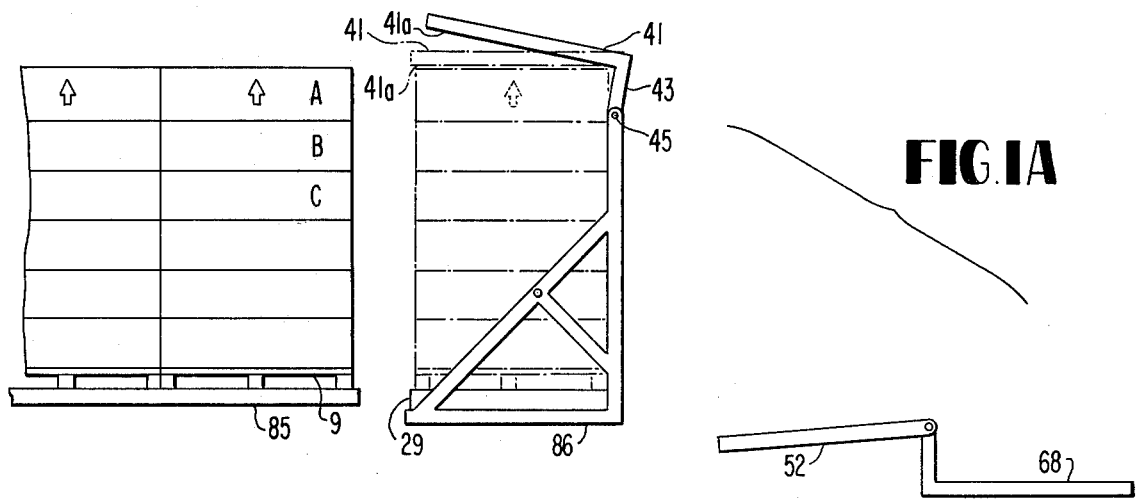
FIGS. 1A–1E are schematic side elevational representations of the successive steps carried out from the time just prior to placing a fully loaded pallet in the apparatus to the time the top layer of cases has been removed and the several trays return to their initial positions to repeat the cycle

Referring to FIGS. 1A-E it is seen that pallets are delivered to the left of the machine, as viewed in the drawings, on a roller table 85 which may be of any desired length. The roller table 85 can be used to store a succession of loaded pallets for emptying. Initially, a pivotable frame 86 having an elevator platform 29, is in an upright position as shown in FIG. 1A. When the pivotable frame is in this position a pallet is easily pushed along roller table 85 onto the elevator platform. To facilitate placing a stacked pallet on the elevator platform, the distance between the bottom of the frame and the under surface 41a of a first pivotally connected fingered platform 41 may be made slightly longer than the anticipated height of a stack of cases. Thus, with the elevator platform 29 in its lowermost position and the first fingered platform 41 slightly raised as shown in FIG. 1A, the first stacked pallet is pushed onto elevator platform 29 of pivotable frame 86 as shown in dotted lines in FIG. 1A. The fingered platform 41 is next lowered to the position shown in phantom in the same FIG. 1A, and the stacked pallet then slightly elevated to permit the under surface 41a of fingered platform 41 to contact and completely embrace the top layer A of the stack of cases. In the several parts of FIG. 1, the top layer of cases is marked with an upwardly pointing arrow to show the various positions assumed during the course of depalletizing.

Figure 1B:
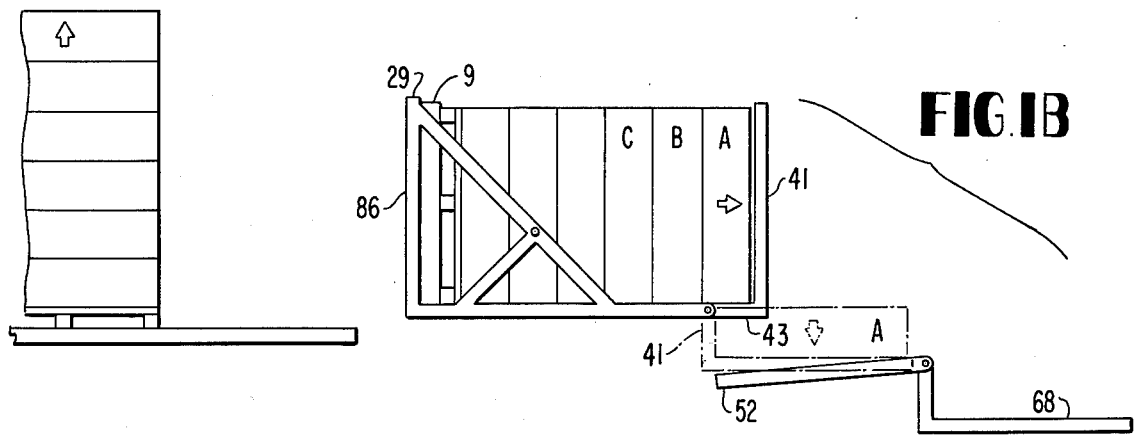

After the fingered platform 41 has been lowered over the top layer A of the cases the entire pivotable platform is rotated 90° in a clockwise direction as shown in FIG. 1B. As seen in FIG. 1B the top layer A of the cases now stands on end and rests primarily on a backing member portion 43 of the fingered platform 41. The axis of rotation of fingered platform 41 is disposed sufficiently behind the center of gravity of the top layer A, for example, near the trailing edge of the top layer A, to enable the top layer A to separate and rotate by gravity with the rotation of the hinged tray 41 through a second 90° arc in a clockwise direction as shown in dotted lines in FIG. 1-B. Removal of the top layer A from the stack is facilitated by the fact that a group of filled and partly (i.e., one-side only) glued cases stacked on their sides tend to compress more on the unglued side (i.e., the trailing or left-hand edge of each case as shown in FIG. 1-B) than on the glued side (i.e., the forward or right-hand edge of each case as shown in FIG. 1-B). The cases remaining on the pallet have a tendency to lean in the direction of the unglued sides (i.e., to lean to the left as shown in FIG. 1-B) and away from the direction of rotation of fingered platform 41, thereby enhancing separation between layers A and B upon rotation of fingered platform 41 and layer A.

When fingered platform 41 has completed the just described 90° rotation, carrying with it top layer A of the original stack of cases, it comes to rest in a position in which the top layer has now been rotated through an angle of 180° and is in an inverted position with respect to its original position on the pallet.

Figure 1C:
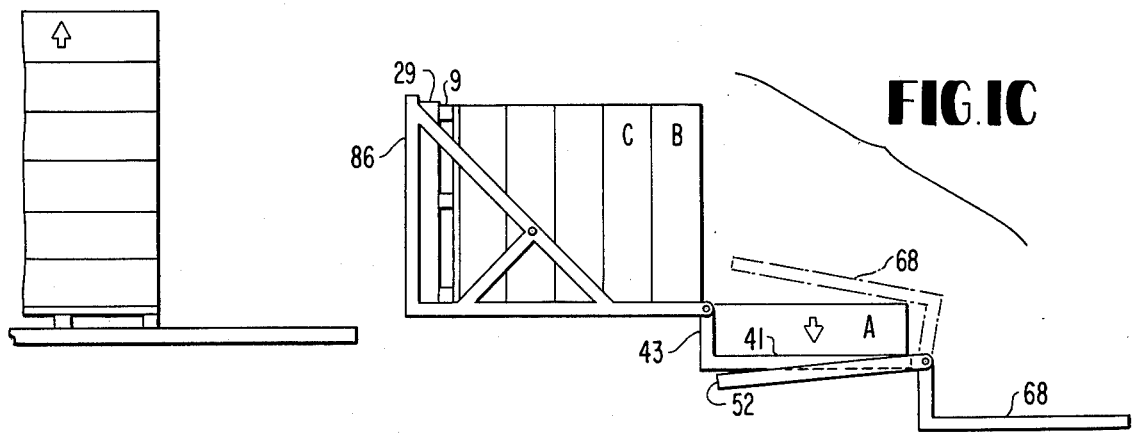
Figure 1D:
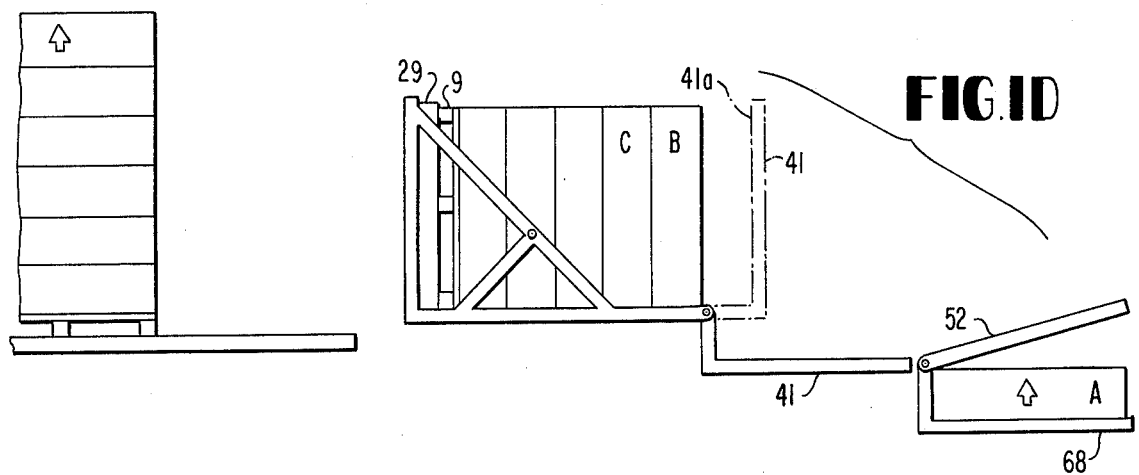
Figure 1E:
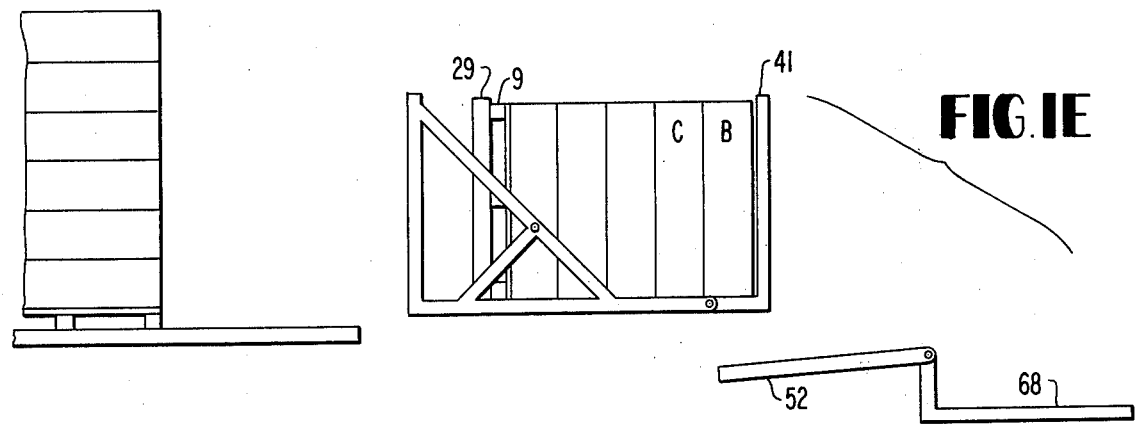

During the time between the initial loading of the pallet onto the pivotable frame 86 and the completion of the 180° rotation as just described, a second fingered platform 52 is extended substantially horizontally toward the left as seen in FIGS. 1A, 1B, and 1C. Because of the fingered construction of both platforms 41 and 52 and a predetermined relative lateral displacement of the fingers of these platforms, the two interdigitate. A third solid platform 68 during this time is extended toward the right as shown in FIGS. 1A, 1B, and 1C. After the first layer of cases, A, has come to rest on fingered platform 41 in the position shown in FIG. 1C, the tray-like platform 68 is rotated counterclockwise as indicated by the dotted outline in FIG. 1C. By rotating the platform 68 in the counterclockwise direction it is made to lie substantially flat over the inverted first row of cases, A. Because fingered platforms 41 and 52 are in an interdigitated position, platform 52 can be rotated clockwise to remove the layer A from platform 41. Since the tray 68 has a solid surface 69, it serves as a means for retaining the bottles within cases A when the latter, together with fingered platform 52 and platform 68, are subsequently rotated clockwise simultaneously as shown in FIG. 1D. At this point, the cases A have been rotated a full 360° and, as shown by the upward direction of the arrow, are now once more in the same orientation as when originally placed on the stack on pallet 9. As soon as the fingered platform 52, together with cases A and platform 68 have cleared the first fingered platform 41 the latter is once more restored to its position shown in dotted outline in FIG. 1D. In that position, it will be seen, there now is a gap between the next layer of cases B and the surface 41a of fingered platform 41. Thereupon the elevator 29 pushes the reclining pallet 9 and the remaining layers of cases a distance of one layer to the right so that the second layer B now occupies a position similar to that formerly occupied by layer A in FIg. 1B. At this time the fingered platform 52 and tray 68 are restored to their initial positions as shown in FIGS. 1A and 1E.

The several steps in the cycle of removing the top layer of cases are repeated until each layer in succession has been removed and an empty pallet is all that remains on elevator platform 29. When this occurs the pivotable frame 86 is once more righted to assume the position shown in FIG. 1A and is now ready to eject the empty pallet and receive a new fully loaded pallet. In this manner, individual layers of cases from a stacked pallet may be removed and safely manipulated through a full 360° arc.

Referring to FIG. 2, the apparatus is seen to comprise a stationary main frame, indicated generally at 10. The main frame 10 stands on suitably spaced legs 12 resting on a floor 11. The legs 12 may be provided with leveling nuts 13. The input and output ends of the apparatus are shown at the left and right hand sides of FIG. 2 and are designated generally as 14 and 15, respectively.

Figure 6:
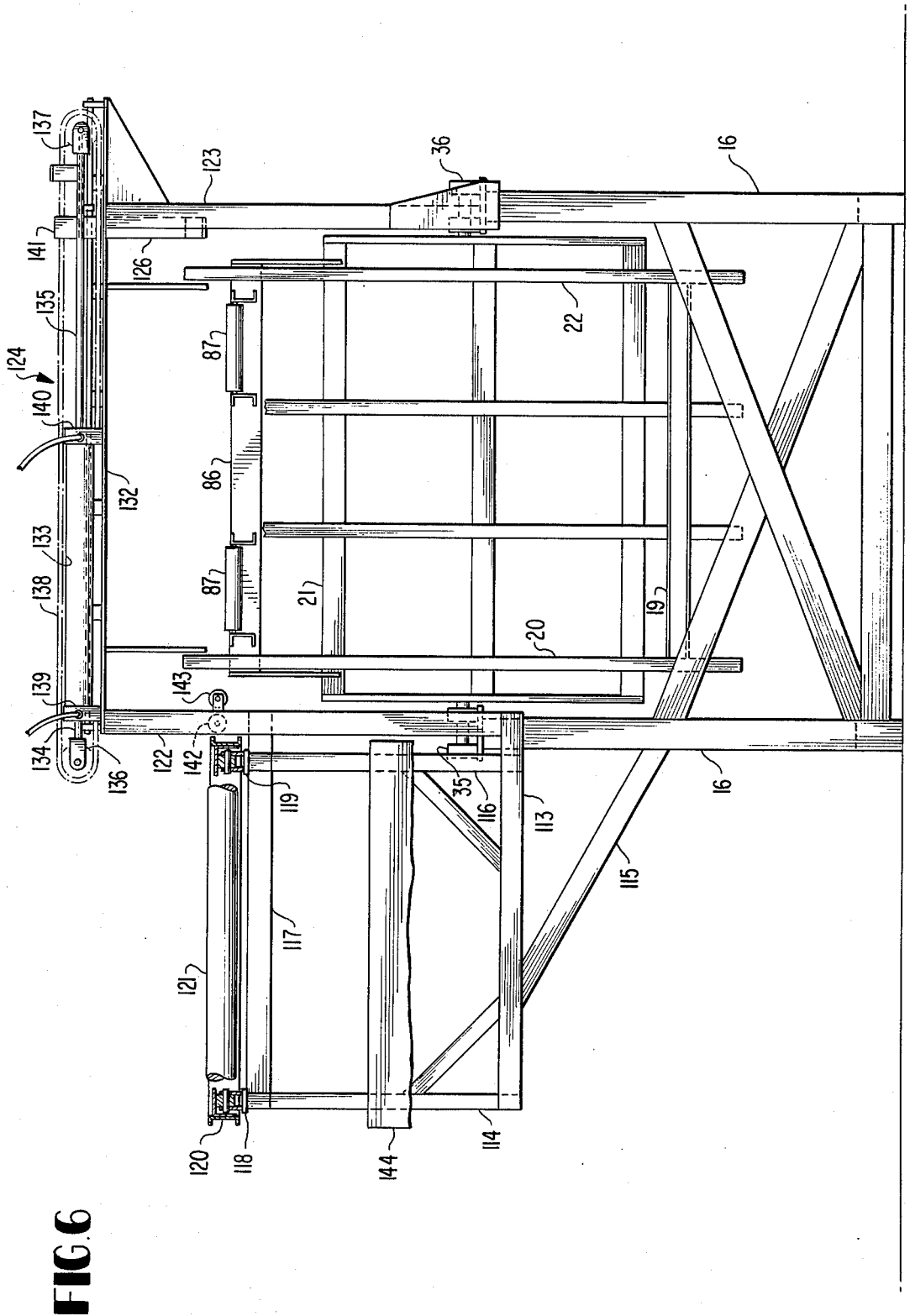
FIG. 6 is an end elevational view of the input end of the apparatus principally showing the means by which an unloaded pallet is placed on the chute shown in FIG. 5.

At the input end 14, the stationary main frame is provided on each side with a box-like supporting frame having vertical side members 16, horizontal top members 17, and bracing members 18 as shown in FIGS. 2 and 6.

Rotatably mounted on the box-like frames is a pivotable frame and elevator assembly shown in isometric in FIG. 4; in a 90°-rotated reclining position in FIG. 2; and in an upright position in FIG. 6.

Referring also to FIG. 6, in which the pivotable frame and elevator assembly is also shown in the 90°-rotated position, it will be seen that the pivotable frame has a rectangular bottom platform portion that may be constructed of steel angle irons 19, 20, 21 and 22. The pivotable frame is also provided with a back portion which comprises a rectangular frame having upright arms 23 and 24. (See FIGS. 2 and 4). A sprocket chain 25 substantially coextensive with the height of the back portion is threaded over sprocket wheels 26 and 27 mounted at opposite ends of one arm 24 of the back portion.

Suitably connected to the chain 25 by means of triangular bracket 28 is an elevator platform 29 upon which loaded pallets are placed. A series of rollers 30 (see FIG. 3) facilitates placing the loaded pallet on elevator platform 29.

The chain 25 is driven by means of a motor 32 through sprocket chain 31 (see FIG. 5) to raise or lower the elevator platform 29. As shown in FIG. 5, platform 29 is in its uppermost position after a pallet has been completely unloaded.

The pivotable frame and elevator assembly is mounted for rotation on both horizontal arms 17 of the main frame by means of stub shafts 33 and 34 supported by bearings 35 and 36. An air or hydraulic cylinder 37 is pivotably connected by one end to upright post 38 on the stationary main frame. An associated piston 40 is pivotally connected to a brace 39 on the pivotable frame. The cylinder and piston assembly is used to tilt the pivotable frame after a pallet has been placed on the elevator platform 29. The cylinder 37 is so placed that when its associated piston 40 is retracted the entire pivotable platfrom with the pallet on it is rotated in a clockwise direction 90° in the view shown in FIG. 2. The pivotable platform is in its upright position, as shown in FIG. 5, when the piston 40 is completely extended.

Pivotably mounted at the top of the vertical frame members 23 and 24 of the pivotable framework is a rotatable L-shaped tray-like member 41. As seen in the detailed view of FIG. 8, the tray-like member 41 is constructed of a plurality of parallel fingers 42 mounted on and extended outward from a solid backing member 43. The tray 41 forms a fingered platform whose function will be described below.

As shown in FIGS. 2 and 5, fingered platform 41 is pivotably mounted at the top of vertical frame members 23 and 24 by means of stub shafts 44 and 45 which lie in the axis of rotation of fingered platform 41. A bearing bracket 46 is pivotably connected by means of stub shaft 47 to a piston 48 associated with an air or hydraulic cylinder 49. This cylinder 49 is suitably connected to the center of the back of the pivotable frame as by means of a pivotable strap 50 mounted on a stationary bracket 51, on the pivotable frame (see FIG. 2). In the positions shown in FIGS. 2 and 5, the piston 48 is extended to place the fingered platform 41 in a position substantially parallel to the elevator platform 29 and over the top layer of cases in a stacked pallet (not shown). After the pivotable platform and the elevator assembly have been rotated 90°, retraction of piston 48 will cause the fingered platform 41 to assume the position shown in phantom in FIG. 2. In that position the fingered portion of the platform 41 is substantially parallel to the floor.

A second fingered tray-like platform 52 (see FIG. 9) is constructed of a plurality of parallel fingers 53 mounted on a solid back 54 which is provided at its ends with cylindrical bushings 55 and 56. As may be seen in FIGS. 2 and 3, the fingered tray platform 52 is pivotably mounted on the stationary main frame on upright posts 57 and 58 by means of shafts 59 and 60 and bearings 61 and 62. The tray 52 is rotated by means of an air or hydraulic cylinder 63 acting through a piston 64, a crank 65, and a sprocket chain 66 which passes over a pair of sprocket wheels (not shown) on shafts 67 and 60. As shown in the plan view (FIG. 3) the fingered platforms 41 and 52 are so placed laterally with respect to one another that they are capable of interdigitating to form, at one point in the process, a single platform lying substantially in one plane. The purpose of this relationship will also be explained below.

A third pivotable tray-like platform 68 is mounted coaxially with fingered platform 52 as shown in FIGS. 2 and 3. Referring also to FIG. 10, the platform 68 is seen to comprise an L-shaped member having a broad, flat carrying surface 69 and a transverse back member 70 at right angles. The back member 70 is provided at each side with extensions 71 and 72 with holes to accommodate stub shafts 59 and 60 so that the platform 68 can rotate on a common axis with the second fingered platform 52. Platform 68 is operated by a separate, independent air or hydraulic cylinder 73 operating through a piston 74, a crank 75 and a sprocket chain 72, and sprocket wheels 76a and 76(b). The latter wheel 76(b) is suitably connected to the platform 68 and is operable to effect rotation thereof about the axis of the stub shafts 59 and 60. Rotation of the fingered platform 52 is similarly accomplished by one of the aforementioned sprocket wheels (not shown) associated therewith.

The cylinder 73 which operates the platform 68 is pivotally mounted on the main frame by means of strip 77 to which are connected stub shafts 78 associated with bearings 79 disposed on mounting blocks 80. As seen in FIGS. 3 and 5, a similar arrangement is provided for the cylinder which operates the fingered platform 52. Thus, referring to FIG. 5, it will be seen that the cylinder 63 is mounted by means of strip 81, stub shafts 82, and bearings 83 on blocks 84 which, in turn, rest on the stationary main frame.

The means by which the depalletized cases are removed from the apparatus once they have come to rest on platform 68 are shown in FIGS. 2, 3, and 7.

Referring to FIGS. 3 and 7, the case-pushing assembly 77 will be seen to comprise a pushing arm 89 mounted on carriage 90. The carriage, in turn, is mounted on two pairs of slides designated 91 and 92 which are slidaly mounted on a pair of parallel rails 93 and 94. As seen from FIGS. 2 and 3 these rails are disposed transversely to the longitudinal axis of the depalletizing apparatus. Rails 93 and 94 are mounted on an elongated box beam member 96 by means of small brackets 95. The box beam 96 in turn is supported on cylinder and chain enclosure 107 by means of small I-beam pedestals 97. The entire assembly 77 can then be rigidly secured to the floor by any suitable means such as a stand 108 as shown in FIG. 2.

The cylinder and chain drive referred to above comprises a double acting air or hydraulic cylinder 98 mounted inside enclosure 107. At the end of one piston 99 there is rotatably mounted a sprocket wheel 101 and a second sprocket wheel 102 is rotatably mounted at the end of the opposing piston 100. A sprocket chain 103 passes around both sprocket wheels and has its ends adjustably secured on cylinder heads 104 and 105. The length of the cylinder and the travel of pistons 99 and 100 are so selected that the maximum travel of a sprocket wheel in either direction will be a litle bit greater than the transverse dimension of pivotable support platform 68. Thus, referring once more to FIGS. 3 and 7, a case 109 is shown in a position from which it is about to be pushed. By extending piston 99 to the left while simultaneously retracting piston 100, the arm 106 which is rigidly connected to both sprocket chain 103 and carriage 90 causes the latter and its attached case pusher 89 to push the case across the platform 68 shown dotted in FIG. 7. The limit of travel of pusher arm 89 and carriage 90 are shown in dotted lines at the left of FIG. 7.

The depalletized cases may now be pushed onto any conventional conveyor to be transported to the bottling machinery. Such a conveyor system does not constitute part of the invention and its selection is entirely within the skill of the art. However, by way of illustration, one suitable conveyor system can comprise a pair of parallel conveyor belts 110 and 111, mounted alongside platform 68, as shown in FIGS. 3 and 7. These belts move at different speeds and may be driven in any known manner for this purpose. Belt 110 is slow-moving while belt 111 moves at a greater linear speed. The case 109 is pushed from platform 68 onto the surface of slow moving belt 110 and strikes against baffle 112 which guides it onto faster moving belt 111 for removal to the bottling location.

After a pallet has been completely emptied of cases it is removed from the apparatus for reuse. Although any suitable pallet stacking mechanism may be employed, various aspects of one embodiment of the mechanism for removing the pallet are shown in FIGS. 3, 5 and 6.

The pallet removal and recovery assembly is mounted alongside the depalletizing apparatus as can be seen from plan view FIG. 3 and rear end view FIG. 6. FIG. 5 shows a side elevation from the pallet removal side of the apparatus.

To support the assembly for receiving and removing an emptied pallet an auxiliary framework is mounted on the stationary main frame comprising members 113, 114, 115 and 116, as seen in FIGS. 5 and 6. Mounted on a rectangular bracket 117 which is secured by any suitable means to the supporting framework for the pallet remover is a pair of bearings 118 and 119. On these bearings is pivotally mounted a tilt chute frame 120 provided with a series of parallel rollers 121. As can be seen from FIGS. 3 and 5 the tilt chute frame 120 is eccentrically mounted. Thus in the view shown in FIG. 5 it can be seen that a a greater proportion of the tilt chute frame 120 is provided to the right of bearings 118 and 119 than to the left of the pivot point. In this manner it is possible to cause the frame to tilt downward with the application of a very light load. The purpose of this will become apparent from the description which follows.

Referring to FIGS. 5 and 6, there is seen erected on both sides of the inlet end 14 of the stationary main frame, a pair of columns 122 and 123 and, spanning these across the width of the stationary main frame, is the pallet pushing assembly designated generally as 124.

Pushing assembly 124 comprises a pusher arm 125 connected by means of arm 126 to movable carriage 127. The carriage is mounted on slides 128 and 129 which in turn rides on parallel rails 130 and 131. The parallel rails are mounted on a transverse platform 132 which is secured in any suitable manner to posts 122 and 123. Also mounted on a platform 132 is a double acting or hydraulic pneumatic cylinder 133 having pistons 134 and 135 extending from opposite ends. Rotatably mounted on the respective ends of pistons 134 and 135 are sprocket wheels 136 and 127 around which is passed sprocket chain 138. The ends of this sprocket chain, similar to those of the case-pushing assembly are adjustably secured to the cylinder heads 139 and 140. A bracket 141 secured to both chain 138 and carriage 127 causes the latter to move with the movement of sprocket chain 138. As shown in FIG. 6, when the right-hand piston is fully extended the pusher arms 126 and 125 are in the extreme righthand position. When a pallet has been emptied and the pivotable frame assembly on which the pallet had been placed is returned to its upright position, the piston 134 is extended toward the left and piston 135 is retracted causing pusher arms 126 and 125 to move toward the left, pushing the empty pallet. A pair of rollers 142 and 143 mounted on past 122 facilitates the transfer of the empty pallet to rollers 121 on the tilt chute frame 120. As soon as the pallet is placed on the tilt chute frame 120 it causes the latter to tilt clockwise as shown in dotted lines in the view of FIG. 5. A slide chute 144, provided at its upper end with a stop plate 148, is so located that its upper end 149 permits substantially a straight line transition of the movement of the pallet downward from tilted frame 120 as it slides onto chute 144. The latter which is supported on legs 145 and 146 terminates in an end 150 which is provided with a pallet guide 147 to guide the removed pallet onto any suitable means for removal from the vicinity of the apparatus and subsequent reuse.

Although removal of the empty pallets was described above as taking place by means of a slide mechanism located alongside the depalletizing apparatus, it will readily be appreciated that other means can be used without falling outside the scope of the invention. Thus, as an alternative to being pushed onto the above described slide mechanism, the empty pallets can be transferred to any conventional pallet stacker (not shown).

Operation of the apparatus can be made fully automatic by means of microswitches mounted on the apparatus at appropriate points (not shown) of the travel of the moving parts in a manner which is familiar to those skilled in the construction of automatic equipment. Thus, it is possible to so program the apparatus that fingered platform 41, for example, can return for a second layer of cases B even before the first layer A has been completely removed from the apparatus and transferred to the travelling belts. In this manner it is possible to have several overlapping cycles, with the result that it is possible to unload a pallet in extremely short time. For example, in the apparatus described above it is possible to complete a cycle in about 40 seconds from the time a loaded pallet is placed on the elevator platform to the time that the latter returns to its lower position for ejection of the pallet.

Although reference was made above to the preferred aspect of the invention in which the cases are rotated 360° before being placed on a conveyor or for transportation to bottling machinery, it is nevertheless within the scope of the present invention to provide for alternate ways of handling the cases after they have been rotated the first 180° from their initial, loading position. For example, the cases could be removed by a pusher bar (not shown) after the first 180° rotation and placed on a conveyor. The individual cases could then be rotated the additional 180° while on the conveyor to restore them to the required unglued flap down position for removal of the cartons.

In the foregoing description of the preferred form of the apparatus, reference was made to various components such as microswitches and pneumatic or hydraulic cylinders. Obviously other means for driving the several moving parts can be substituted for those which are shown in the drawings and described in the foregoing specification without departing from the spirit of the present invention. It will also be apparent that other means are available for removing the depalletized cases as well as for ejecting empty pallets. Accordingly the present invention is not to be considered limited by the specific means which were used to illustrate the invention, but to include within its scope any equivalently functioning component or mechanism as will be apparent to those skilled in the art.

Having described the invention what I now claim is:

1. Depalletizing apparatus for unloading a pallet stacked with a plurality of layers of parallelepiped-shaped objects comprising:
   a. a stationary main support frame;
   b. a pivotable support frame mounted on said stationary main support frame for rotation about a horizontal axis;
   c. means for placing a stacked pallet on said pivotable support frame;
   d. means on said stationary main support frame for rotating the pivotable support frame together with the stacked pallet, 90° about its horizontal axis;
   e. first holding means pivotably connected to said pivotable support frame adjacent the first, top layer of the stack, opposite the pallet, for rotation about a horizontal axis; means for rotating said first holding means together with said first layer 90° to a reclining position from an initial upright position; and
   means for transferring said first layer of objects from said first holding means and for rotating said first layer of objects 180° about a horizontal axis so that said objects of said first layer assume the same orientation as when placed onto said pivotable support frame.

2. The depalletizing apparatus of claim 1 wherein said transferring means comprise:
   f. second holding means pivotably connected for rotation about a horizontal axis, said second holding means being located to receive said first layer from the first holding means;
   g. means for rotating said second holding means 180° from an initial position of receipt of said first layer from the first holding means;
   h. means for retaining said first layer on said second holding means during rotation of said second holding means;
   i. means for removing the first layer from the apparatus after rotation; and
   j. means for returning said first and second holding means to their initial positions.

3. Apparatus as in claim 2 wherein the means for retaining the layer on the second holding means comprises a third holding means pivotally connected for rotation about the same horizontal axis as said second holding means.

4. Apparatus as in claim 2 wherein the means for removing the first layer from the apparatus after rotation comprises pushing means laterally adjacent the stationary support frame.

5. Apparatus as in claim 2 further comprising means adjacent the pivotable support for removing an unloaded pallet from the apparatus.

6. Apparatus as in claim 1 wherein the means for securing the stacked pallet comprises separate means for embracing and supporting the bottom, top and one side of the stacked pallet.

7. Apparatus as in claim 6 wherein the means for embracing and supporting the top of the stacked pallet comprises the first holding means.

8. Apparatus as in claim 6 wherein the means for embracing and supporting the bottom of the stacked pallet comprises a movable platform for raising or pushing the stacked pallet.

9. Apparatus as in claim 8 further comprising drive means connected to the movable platform for advancing said platform in predetermined increments of distance.

10. Apparatus as in claim 1 wherein the first holding means comprises a first tray-like fingered support platform having a plurality of rigid finger elements all extending in a common plane parallel to a plane which extends radially from the axis of rotation of said first holding means.

11. Apparatus as in claim 10 wherein said rigid finger elements comprise a first support surface for the first, top layer of the stacked pallet and the said axis of rotation is located sufficiently behind the center of gravity of the top layer to enable the top layer to rotate by gravity with the rotation of the said first holding means.

12. Apparatus as in claim 10 including second holding means pivotably connected for rotation about a horizontal axis, said second holding means being located to receive said first layer from the first holding means wherein the second holding means comprises a second tray-like fingered support platform having a plurality of rigid finger elements all extending radially in a common plane from the axis of rotation and located to be capable of interdigitation with the first fingered tray member.

13. Depalletizing apparatus for unloading a pallet stacked with a plurality of layers of cases, said apparatus comprising:
   a. pivotable support means rotatable about a horizontal axis for receiving a stacked pallet in a vertical position;
   b. separate bottom-, top-, and the side-embracing means to secure said pallet and cartons to said pivotable support means;
   c. means for rotating said pivotable support means together with a stacked pallet supported thereon through an angle of 90° from an initial vertical position to place said support means and said pallet in a reclining position;
   d. means connected to said pivotable support means for separately rotating said top-embracing means together with a top layer of cases an additional 90°;
   e. transfer means for removing said top layer of cases from top-embracing means and means connected to the transfer means for rotating said transfer means a further 180° thereby reorienting said first layer to its initial position; and
   f. means for removing the reoriented cases from the transfer means.

14. Depalletizing apparatus as in claim 13 wherein the means for removing the reoriented carton comprises means for pushig said carton from the transfer means.

15. Depalletizing apparatus as in claim 13 wherein the bottom-embracing means comprises means to elevate a stacked pallet when in the vertical position and to push said pallet horizontally when in the reclining position.

16. Depalletizing apparatus as in claim 13 wherein the top-embracing means comprises a first tray-like member for clamping and holding a first layer of cases on a stacked pallet, said first tray-like member being pivotable about an axis of rotation.

17. Depalletizing apparatus as in claim 16 wherein the axis of rotation of the first tray-like member is disposed sufficiently behind the center of gravity of the said first layer of cases to enable the said first layer of cases to rotate by gravity with rotation of the said top-embracing means.

18. Depalletizing apparatus as in claim 13 wherein the transfer means comprises a second pivotable, tray-like member placed to receive a layer of cases from the top-embracing means in combination with clamping means to retain said layer on the transfer means during a 180° rotation.

19. Depalletizing apparatus for unloading a pallet loaded with a plurality of layers of cases, said cases being stacked with unglued sides down, said apparatus comprising:
   a. a stationary main support frame;
   b. a pivotable support frame on said stationary main support frame mounted for rotation about a horizontal axis;
   c. means connected to said support frames for rotating said pivotable support frame 90° from an initial vertical position relative to said stationary main support frame;
   d. separate bottom-, top-, and side-embracing means on said pivotable support frame for securing a stacked pallet thereon,
      said bottom-embracing means comprising an elevating platform,
      said top-embracing means comprising a first tray-like member adapted to fit over and contain the top layer of cases on a loaded pallet and being pivotably mounted on said pivotable support frame for rotation about a horizontal axis, and
      said bottom-, top-, and side-embracing means securing a stacked pallet when said pivotable support frame, a pallet thereon, and the stacked cases on said pallet are in a rotated, reclining position 90° from the vertical;
   e. means for rotating said top-embracing means and a contained top layer of cases a further 90° from the reclining position of the loaded pallet, the axis of rotation of said top-embracing means being disposed sufficiently behind the center of gravity of the said top layer of cases to enable the said top layer of cases to rotate by gravity with rotation of said top-embracing means;
   f. a second tray-like member pivotably mounted on the stationary main support frame for rotation about a horizontal axis and positioned to receive and remove the contained layer of cases from the top-embracing means and rotate said layer of cases an additional 180°, thereby to reorient the cases to the same relative position as originally on the pallet;
   g. conveyor means adjacent the stationary support frame; and
   h. means for placing said reoriented cartons on said conveyor means.

20. Depalletizing apparatus as in claim 19 wherein said top-embracing member and said second tray-like member each comprises an axial portion for pivotable mounting and a plurality of fingers rigidly attached to each of said axial portions, said fingers extending radially from said axial portions in a single plane.

21. Depalletizing apparatus as in claim 20 wherein the top-embracing member and the second tray-like member are positioned to interdigitate for transfer of a layer of cartons from said top-embracing member to said second tray-like member.

22. Depalletizing apparatus as in claim 19 further comprising pallet removing means to remove an emptied pallet from the pivotable support means.

23. Depalletizing apparatus as in claim 22 wherein the pallet-removing means comprises means adjacent the pivotable support frame for pushing an empty pallet therefrom and means for receiving and removing said empty pallet.

24. Depalletizing apparatus for removing successive individual layers of stacked cases from a loaded pallet comprising:
   a. a stationary main support frame extending in a longitudinal direction from an input point to an output point;
   b. a pivotable, vertically extending support frame on said stationary main support frame mounted for rotation about a transverse, horizontal axis;
   c. a horizontally disposed, vertically movable, pallet-supporting elevator platform on said pivotable support frame;
   d. a first pivotable tray-like fingered, support platform on said pivotable support frame vertically separated from said pallet-supporting elevator platform by a distance at least equivalent to the height of a stacked carton when said elevator platform is in its lowermost position, said first fingered support platform being mounted for rotation about a horizontal axis transverse to the stationary support frame;
   e. drive means connected to the pallet-supporting elevator platform to raise and lower said platform;
   f. a second pivotable, tray-like fingered support platform mounted on the stationary main support frame for rotation about a transverse horizontal axis removed from the axis of said first pivotable, tray-like fingered, support platform in a forward direction, said axis being so located as to permit interdigitation when said fingered support platform are in a common horizontal plane to enable said second fingered support platform to remove a layer of cases carried by said first fingered support platform;
   g. means for rotating the pivotable support frame 90° in a forward direction from the initial vertical to a horizontal reclining position and for returning said pivotable support frame to the original vertical position;
   h. means for rotating the first fingered support platform at least an additional 90° while carrying a layer of cases for interdigitation with and to deposit said cases on the second fingered support platform;
   i. means for forwardly rotating said second fingered support platform 180° from its point of interdigitation with the first fingered support platform while carrying the layer of cases removed from said first fingered support platform;
   j. a third pivotable tray-like support platform rotatable about a common axis with the second fingered support platform for securing and supporting the layer of cases during and subsequent to said 180° rotation;

k. conveyor means adjacent the rotated position of the third tray-like support platform;

l. means for transferring the layer of cases from said third support platform;

m. means for removing an empty pallet from the pivotable support frame.

25. A method for unloading a pallet stacked with a plurality of layers of cases, whereby said cases are removed as individual layers without sliding said cases over an adjacent layer and are deposited as a single layer on a surface with a 180° orientation from the original orientation, said method comprising:

a. supporting the bottom, top, and one side of a vertical stack comprising a plurality of layers of cases on a pallet;

b. rotating the pallet together with the stack 90° while continuing to support the bottom, top and side thereof, to place said stack and pallet in a reclining position, thereby causing the top layer of said stack to become a first end row;

c. rotating the first end row a further 90° while translating said row in a longitudinal direction away from the stack whereby said first end row is in an inverted position relative to its original orientation on the upright stack and a second end row is produced at the end of the reclining stack; and d. further rotating the said inverted first end row and additional 180° while further translating said first row in a longitudinal direction away from the reclining stack and pallet, thereby to reorient said first row to a position as in the original vertical stack.

26. A method as in claim 25 wherein each successive end row on the reclining pallet is rotated first 90° with longitudinal translation and then an additional 180° with further translation until all of the layers have been removed.

* * * * *